Feb. 3, 1948.  W. J. BIGLEY, JR  2,435,194
TANK TRACK
Filed Nov. 1, 1944
Fig. 1.
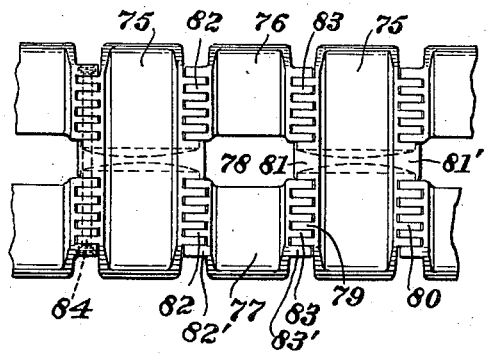
Fig. 2.
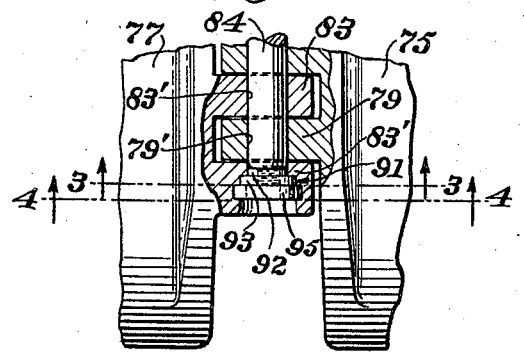
Fig. 3.
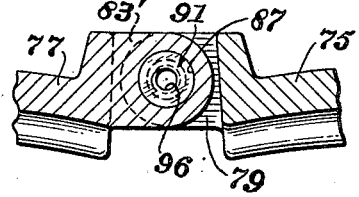
Fig. 5.
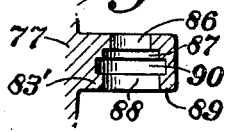
Fig. 4.
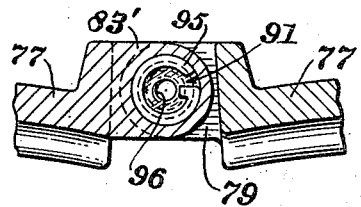
Fig. 6.
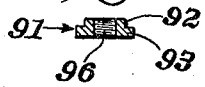
Fig. 7.
Inventor:
William J. Bigley, Jr.,
By Cushman Darby & Cushman
Attorneys.

Patented Feb. 3, 1948

2,435,194

UNITED STATES PATENT OFFICE 2,435,194

TANK TRACK

William J. Bigley, Jr., New York, N. Y.

Application November 1, 1944, Serial No. 561,441

8 Claims. (Cl. 305—10)

The invention of the present application is in the nature of an improvement upon the tank track construction shown and claimed in my prior Patent 2,353,122, July 11, 1944.

The primary object of the present invention is to improve the tank or tractor track structures of that patent, and, more particularly, to provide improved means for preventing inadvertent removal of the hinge pins, employed to connect the articulated sections to each other.

A further object is to provide hinge pin retaining means which will not fail in use and which will have a longer life than devices of the prior art, designed to perform the same general function.

Another object is to provide hinge pin retaining means for tank or tractor tracks which may be repeatedly removed and re-applied, without becoming fatigued or otherwise defective, so that the likelihood of failure in use is substantially completely eliminated.

With tank and tractor track constructions of the type shown in the above-identified patent, the dimensions of the various elements are extremely critical. For instance, it is of major importance to maintain the hinge pins of minimum diameter while still retaining sufficient strength and resistance to shear to perform the intended functions. Tractor tracks of this type are operated without lubrication of the hinge pins, and, in order to reduce friction to a minimum, the pins and the apertures in the bosses in which they are disposed must be maintained as small as possible, consistent with the necessary strength and ruggedness.

In the construction of the above-mentioned patent, substantially circular or G-shaped expansible spring elements are seated in grooves in the end bosses of each intermeshing set of bosses, in abutting relation to the ends of the hinge pins, to prevent endwise removal thereof, even if the pins should be broken intermediate their ends. With hinge pins of relatively small diameter, as contemplated by the patent, spring elements of similarly reduced diameter were necessarily employed. If larger rings or clips were used, there would be a danger that the pins might pass through their central openings, for instance, by shearing the inwardly projecting end of the G-shaped spring clip. Hence, the springs of the patented construction were conventionally only substantially $\frac{1}{16}$ of an inch greater in diameter than the pins. For instance, when $\frac{3}{8}$ inch pins were employed, the circular recess in the outermost boss had an internal diameter of only $\frac{7}{16}$, thus necessitating the use of correspondingly small spring clips.

It was found in practice that these relatively small elements tended to become fatigued or otherwise lost their resiliency when repeatedly inserted and removed from the recesses in the bosses, with the result that they would sometimes break and become dislodged. Moreover, the small size of the spring clips made them somewhat difficult to handle and to insert or remove from operative position. However, larger spring clips could not be employed, without entirely re-designing the track structure and increasing the diameter of the hinge pins which, for reasons pointed out above, was impracticable.

The present invention aims to overcome all of the difficulties of the prior construction and to provide an arrangement of parts in accordance with which a much larger spring element may be employed to perform its intended function, without changing the dimensions of other parts of the construction.

A preferred embodiment of the invention is illustrated in the accompanying drawings, in which Figure 1 is a plan view of the ground engaging surface of the tank or tractor track, Figure 2 is a similar fragmentary view, on an enlarged scale, with certain parts shown in section, Figure 3 is a transverse section on line 3—3 of Figure 2, Figure 4 is a transverse sectional view on line 4—4 of Figure 2, Figure 5 is a section of one of the end bosses, Figure 6 is a section of a special abutment disc and, Figure 7 is a section of an expansible spring element, shown in elevation in Figure 4.

Reference is again made to my prior Patent 2,353,122 for a description of a tank or tractor, the supporting wheels therefor, the track construction and the driving sprockets associated therewith. The present specification and drawings should be considered in connection with the disclosure of that patent.

Referring to the accompanying drawings, the track of the present invention comprises a plurality of interconnected, articulated links arranged in a repeating cycle consisting of transversely elongated full width sections 75 and pairs of relatively narrow spaced apart sections 76, 77, the latter sections leaving central apertures 78. The sections 75 are each provided with two sets of relatively narrow forwardly and rearwardly projecting bosses 79, 80 on their corresponding front and rear edges, having aligned apertures 79' therein. Also, they have centrally positioned relatively wide forwardly and rearwardly projecting apertured bosses 81, 81'. Each of the narrow intermediate sections 76, 77 has a set of forwardly and rearwardly projecting bosses 82, 83, staggered with respect to the bosses on the sections 75 and disposed adjacent thereto in the space therebetween, in intermeshing relation. The bosses 82, 83 likewise have apertures formed therein, in alignment with each other and with the apertures 79', when the sections are assembled. The sections are interconnected by hinge pins 84 extending through the apertures in the respective bosses as indicated in Figure 2. Preferably, each pin extends entirely across the track and has its end faces disposed adjacent to or within the aperture in the outermost bosses 82', 83' carried by the narrow track sections 76, 77.

The specific construction of the aperture, bore and internal recess or groove in each of the end bosses 82', 83', is of considerable importance. Referring to Figures 2 and 5, the end boss 83' is provided at its inner end with an aperture 86 aligned with and of the same diameter as the apertures in the intermediate, intermeshing bosses 79 and 83.

The aperture 86 communicates with a coaxial bore 87 of enlarged diameter having a continuation 88 adjacent the outer end of the boss, opening upon the outer face 89 thereof. The inner and outer sections 87 and 88 of this bore are interrupted by an annular groove or recess 90 formed in the wall thereof, the groove being of greater diameter than the remainder of the bore, while the latter is of larger diameter than the aperture 86 and the pin 84. The inner wall of the section 87 of said bore constitutes an outwardly presented face or ledge which is integral with and therefore non-yielding or rigid against movement with respect to its boss in a direction axially of the hinge pin 84.

A special disc 91 (Figures 2, 3 and 6), having a portion of reduced diameter 92 and another portion of enlarged diameter 93, is adapted to be positioned within the opening in the boss 83', with the reduced portion disposed within the aperture 86, in snug fit therewith, and the enlarged portion 93 disposed within the bore section 87 of enlarged diameter. The disc acts as an abutment member for the end of the hinge pin 84, as hereinafter explained, and the inner face of its enlarged portion 93 engages said outwardly presented face of the section 87 of said bore, as shown in Figure 2.

A substantially circular or G-shaped, expansible spring member 95, having the same external diameter, when contracted, as the internal diameter of the recess or groove 90 is disposed in the recess, in abutting relation to the end face of the disc 91. As shown in Figures 2 and 4, the ring or clip 95 overlies the margin of the disc 93 and effectively prevents endwise removal of the disc. Since the disc is in abutting relation to the pin 84, removal of the latter is likewise prevented. As shown in Figure 2, the ring or clip 95 retains the disc 91 in its inner position with the inner face of its portion 93 in engagement with the outwardly presented face of the section 87 of said bore.

It will be understood that the spring clip 95 is disposed within the circular recess or groove 90 under compression and that the expanding force thereof urges its circumference into contact with the bottom wall of the groove. The restricted bore section 88 effectively prevents its removal, until the clip or ring is deliberately contracted so that it may pass through the bore section 88.

The disc 91 is provided with means to facilitate its removal. As shown in the drawings, it is formed with a central, internally threaded aperture 96 so that a threaded tool, such as a simple bolt or screw may be inserted therein. The tool and the disc may then be withdrawn, since the outer bore 88 is of the same diameter as the inner section 87 and the disc will pass therethrough. When the spring clip and the disc have thus been removed, the hinge pin may readily be driven out of the aligned apertures and replaced by a new pin. The disc 91 may be replaced and the spring clip 95 snapped into the recess 90. It will be apparent that the removal of a defective track section or of a defective pin is, therefore, an extremely simple matter.

The present invention makes it possible to employ a very materially larger spring clip than was possible with the construction of my prior patent, without re-designing the entire assembly and providing larger hinge pins. In practice, a spring clip having an external diameter, when contracted, of $\frac{9}{16}$ has been found to be entirely satisfactory and the present invention makes possible the use of such devices.

All changes coming within the scope of the appended claims and their equivalents are included within the invention.

I claim:

1. A tank or tractor track comprising a series of sections having transversely spaced apertured bosses on their end edges, the sections being assembled with the bosses on each section intermeshing with those on the adjacent sections and with the apertures in each set of intermeshing bosses in alignment, the outermost boss of each set having an inner aperture of the same diameter as the apertures in the adjacent bosses, a coaxial, enlarged bore communicating with said aperture and with the outer face of the boss and an internal recess of still larger diameter in the wall of the bore between its ends, a pin extending through the aligned apertures, said bore having an inner wall constituting an outwardly presented face which is rigid against movement with respect to said bosses in a direction axially of said pin, an abutment disc in the inner end of the bore, and an expansible spring element confined in said recess in abutting relation to the disc to prevent endwise removal of the disc and the pin, said spring element serving to retain said disc with its inner surface in engagement with said outwardly presented face of said bore.

2. A tank or tractor track comprising a series of sections having transversely spaced apertured bosses on their end edges, the sections being assembled with the bosses on each section intermeshing with those on the adjacent sections and with the apertures in each set of intermeshing bosses in alignment, the outermost boss of each set having a bore of larger diameter than the apertures in the intermediate bosses and having an internal, circumferential groove in the wall of said bore, a pin extending through the aligned apertures, said bore having an inner wall constituting an outwardly presented face which is rigid against movement with respect to said bosses in a direction axially of said pin, an abutment disc in said bore, and an expansible spring element confined in the groove in abutting relation to said disc, to prevent endwise removal of the disc and pin, said spring element serving to retain said disc with its inner surface in engagement with said outwardly presented face of said bore.

3. A tank or tractor track comprising a series of sections having transversely spaced apertured bosses on their end edges, the sections being assembled with the bosses on each section intermeshing with those on the adjacent sections and with the apertures in each set of intermeshing bosses in alignment, the outermost boss of each set having an aperture adjacent its inner face of the same diameter as and aligned with the apertures in the intermediate bosses, a bore of larger diameter extending to the outer face of the boss and communicating with said aperture, a circumferential groove in the bore, a pin extending through the aligned apertures, said bore having an inner wall constituting an outwardly presented face which is rigid against movement with respect to said bosses in a direction axially of said pin, and means for preventing endwise removal of said pin from the bosses, said means comprising a unitary disc having a portion of reduced diameter disposed in the aperture in the end boss in abutting relation to the end of the pin and a portion of larger diameter disposed in the enlarged bore, and an expansible spring element confined in the groove and disposed in abutting relation to the face of the enlarged disc portion, said spring element serving to retain said disc with the inner surface of its portion of larger diameter in engagement with said outwardly presented face of said bore.

4. A construction in accordance with claim 3 characterized in that said disc is provided with means to facilitate its removal from the bore, for the removal of a pin, after removal of the expansible spring element.

5. A construction in accordance with claim 3 characterized in that said disc is provided with a threaded aperture for the reception of a threaded disc removing tool, to facilitate removal of the disc after the expansible spring element has been removed.

6. In a tank or tractor track comprising a series of articulated sections each having a plurality of apertured bosses on its end edges disposed in intermeshing, transversely aligned relation with the bosses on the adjacent sections and a hinge pin disposed in the apertures in the bosses and connecting each section to the next, the improved means for preventing accidental removal of the pins, which comprises an enlarged bore in one of the outermost bosses of each set of intermeshing bosses aligned with the apertures in the adjacent bosses, said bore having an inner wall constituting an outwardly presented face which is rigid against movement with respect to said bosses in a direction axially of said pin, a laterally enlarged annular recess formed in the circumferential wall of said bore, an abutment disc of larger diameter than the pin disposed in the bore and removable outwardly therethrough, and a substantially circular, expansible spring element disposed in said recess in abutting relation to the outer face of said disc, to prevent accidental removal thereof, said spring element serving to retain said disc with its inner surface in engagement with said outwardly presented face of said bore.

7. A construction in accordance with claim 6 characterized in that said bore communicates at its inner end with an aperture of substantially the same diameter as the apertures in the adjacent bosses and in that said disc has a portion of reduced diameter disposed within said aperture in abutting relation to the end of the pin.

8. A construction in accordance with claim 6 characterized in that the bore communicates at its inner end with an aperture of the same diameter as and aligned with the apertures in the adjacent bosses and in that the disc has portions of reduced and enlarged diameters disposed respectively in the aperture and in the bore.

WILLIAM J. BIGLEY, Jr.

REFERENCES CITED

The following references are of record in the file of this patent:

UNITED STATES PATENTS

| Number | Name | Date |
| --- | --- | --- |
| 2,353,122 | Bigley, Jr. | July 11, 1944 |
| 1,637,247 | Snyder | July 26, 1927 |